United States Patent
Chiarenza

(10) Patent No.: US 6,897,595 B1
(45) Date of Patent: *May 24, 2005

(54) AXIAL FLUX MOTOR WITH ACTIVE FLUX SHAPING

(76) Inventor: Kevin J. Chiarenza, 822 1/2 27th St., San Pedro, CA (US) 90731

( * ) Notice: Subject to any disclaimer, the term of this patent is extended or adjusted under 35 U.S.C. 154(b) by 0 days.

This patent is subject to a terminal disclaimer.

(21) Appl. No.: 10/811,363
(22) Filed: Mar. 29, 2004
(51) Int. Cl.$^7$ .............................. H02K 1/16; H02K 1/27
(52) U.S. Cl. ...................... 310/216; 310/254; 310/268; 310/156.53; 310/156.56
(58) Field of Search ................................ 310/216, 254, 310/267, 268, 156.56, 156.53

(56) References Cited

U.S. PATENT DOCUMENTS

| | | | | |
|---|---|---|---|---|
| 1,863,294 A | * | 6/1932 | Bogia | 310/46 |
| 3,700,942 A | * | 10/1972 | Alth | 310/164 |
| 3,762,042 A | * | 10/1973 | Abe et al. | 29/598 |
| 4,358,693 A | * | 11/1982 | Palmer et al. | 310/46 |
| 4,371,801 A | * | 2/1983 | Richter | 310/156.36 |
| 5,117,141 A | * | 5/1992 | Hawsey et al. | 310/114 |
| 5,977,684 A | * | 11/1999 | Lin | 310/268 |
| 6,552,460 B2 | * | 4/2003 | Bales | 310/156.35 |
| 6,750,588 B1 | * | 6/2004 | Gabrys | 310/268 |

\* cited by examiner

*Primary Examiner*—Tran Nguyen
(74) *Attorney, Agent, or Firm*—Irving Keschner

(57) ABSTRACT

An improved electric motor design wherein the interior surface of the stator has a plurality of corrugations intersected by annular grooves formed therein and a corresponding number of rotor disks having permanent magnets secured to their outer surface, the permanent magnets being positioned to rotate within the grooves. The magnets alternate in polarity about each disk as well as being offset about the circumference from disk to disk so that one disk set will align with the pole face created by the intersection of the corrugations and the adjacent annular grooves and the other disk set will be offset from the corrugations and pole faces. Alternately energizing coils positioned within a plurality of notches formed in the outer surface of the stator with alternating current causes the magnets and their associated disks to reposition themselves in a manner that causes the motor shaft to rotate as well as shaping the core flux field for more efficient use, thereby increasing motor torque.

12 Claims, 5 Drawing Sheets

AXIAL FLUX MOTOR WITH ACTIVE FLUX SHAPING

BACKGROUND OF THE INVENTION

1. Field of the Invention

The present invention provides an axial flux, electromotive generating device that includes rotors having a plurality of magnets mounted thereto and a stator core assembly having a plurality of annular grooves and corrugations formed along the interior and exterior of the stator.

2. Description of the Prior Art

Axial flux electromotive generating devices have been widely described in the prior art. For example, U.S. Pat. No. 6,445,105 to Kliman et al describes such a device having a rotatable shaft, a rotor disk coupled to the shaft, a permanent magnet supported by the rotor disk, a stator extension positioned in parallel with the rotor disk, two molded iron pole elements attached to the stator extension and facing the permanent magnet and two electrical coils wrapped around the corresponding two molded iron pole elements.

U.S. Pat. No. 6,323,576 to Applegate discloses an electromotive generator which utilizes a plurality of stator members, each stator member including a coil and top and bottom elements separated by a gap. The top and bottom elements each include a face. The generator further includes a rotor having a plurality of magnets. The rotor is rotatably mounted, such than the plurality of magnets pass within the gaps in the stator members when the rotor is rotated with respect to the stator. The magnets have a shape substantially equal to the shape of the stator member faces. Each of the magnets overlaps the stator ices as the rotor rotates such than the area of overlap and non-overlap of each of the magnets changes non-linearly.

Both of the above patents exemplify the general concept of axial flux motors.

Copending application Ser. No. 10/457,318 filed Jun. 10, 2003, the inventor thereof being the inventor of the subject matter of the instant application, discloses an axial flux electromotive device with a stator having a single coil and an internal structure forming a plurality of corrugations comprising peaks and valleys intersected by annular grooves thus forming pole faces and rotor disks having permanent magnets secured to the outer surface of the disks and positioned to rotate within the grooves. The permanent magnets are opposed in polarity disk to disk as well as being offset about the circumference so that one disk set will align with one set of corrugations and the other disk set will align with the pole face created by the intersection of the corrugations and the adjacent annular grooves. Energizing the single coil with alternating current causes the permanent magnets and associated disks to rotate.

What is desired is to provide an improved device that produces increased torque as the stator coils (or coil) are energized, wherein more efficient utilization of field interactions by actively shaping the flux field as well as reacting to it is provided, and wherein the device is simplified in construction and control.

SUMMARY OF THE INVENTION

The present invention provides an improved electric motor design wherein the stator and rotor configuration is arranged to produce a core flux efficiently shaped and utilized to enhance motor torque without substantially increasing the corresponding electrical power furnished to the motor.

The internal surface of the stator has a plurality of corrugations formed therein along the longitudinal axis thereof forming peaks and valleys, intersected by annular grooves thus forming pole faces and rotor disks having permanent magnets secured to the outer surface of the disks, the disks rotating within the annular grooves. The magnets are alternately opposed in polarity about each disk and the disks are offset from each other by n degrees about the disk circumference along the stator longitudinal axis such that one disk and magnet set will align with the pole faces formed at the intersection of corrugation peaks and adjacent annular grooves and the other disk and magnet set will be offset from the pole faces by n degrees.

The external surface of the stator includes annular notches, or depressions spaced along the longitudinal axis of the stator and centered about the disks; a coil is wound in each of the depressions thus providing a solenoid effect. Alternately energizing the coils generates core flux which causes the magnets and their associated disk to reposition themselves in a manner that causes the motor shaft to rotate, the configuration of the internal stator surface shaping the core flux for more efficient use, thereby increasing motor output torque.

The present invention improves upon the invention set forth in the '318 application and, in general, existing axial flux motor concepts as described in the prior art set forth hereinabove. Specifically, axial flux motors tend to fall into two categories of construction, multiple coil or coil and yoke, both typically using a rotor disk with multiple magnets about a circumference. The "multiple coil motor" relies on a stator assembly having many separate coils mounted about the same circumference as the rotor disk magnets; this is complicated and unwieldy for compact motor construction since fitting many coils into a confined area of the rotor increases heat and eddy current losses. The "coil and yoke" design attempts to circumvent coil size restrictions of multiple coil motors but does so with a loss of coil flux available at the stator pole face as the yoke design fails to utilize all available flux created by the stator coil.

The '318 application discloses an axial flux motor utilizing one stator coil per two rotor disks and two assemblies of the aforementioned rotor disks per motor core, and alternating the permanent magnets polarity from disk to disk, the disk magnets permanent fields more efficiently aligning with the available stator coil flux variances created by the shaped stator core thereby increasing motive force.

The present invention provides advantages over the prior art designs utilizing a single stator coil per rotor disk by providing a ferromagnetic stator core shaped to allow the stator coils (solenoids) to magnetically engage with multiples of magnets secured to the rotor disk circumference, (two coils and two disks create a basic motor core, multiples thereof can be utilized for more powerful motor cores). In addition, by utilizing one stator coil per rotor disk and two assemblies of the aforementioned per motor core, the stator coil assembly is energized alternately, the intervening stator coil "off" state allowing for reduced reactance in the stator coil circuit since the stator coil has time to dissipate its magnetic energy before reversing current flow. As the rotor disk and magnets are centered within the stator core and coil (an area of highest flux potential and hence electromotive force), the magnetic fluxes created by the stator core coils are utilized more efficiently for motor disk rotation.

The ferromagnetic stator core of the present invention creates an axially directed magnetic field and, by varying the magnetic permeability through the stator core interior, stator coil flux density is varied, resulting in a "preferred shape" of the coil field. This "shaped" coil field is more efficiently utilized as the disk and magnet geometry is such that during rotation the disk magnets permanent fields will align with or "reinforce" the flux variances or shape of the stator coil field as the stator coils are energized. The shaped stator core, coil and rotor disk magnet geometry utilize the aforementioned flux variances to impart motive force to all of the magnets about the rotor disk, both those attracted to or repelled form the stator pole faces and stator coil field, thus increasing the available motor torque.

The low minimum number of stator coils (two in this instance) required for motor operation results in an ease and simplicity of motor control circuitry thus reducing cost and complexity.

DESCRIPTION OF THE DRAWINGS

For a better understanding of the present invention as well as other objects and further features thereof, reference is made to the following description which is to be read in conjunction with the accompanying drawing therein.

DESCRIPTION OF THE INVENTION

Figure 1:
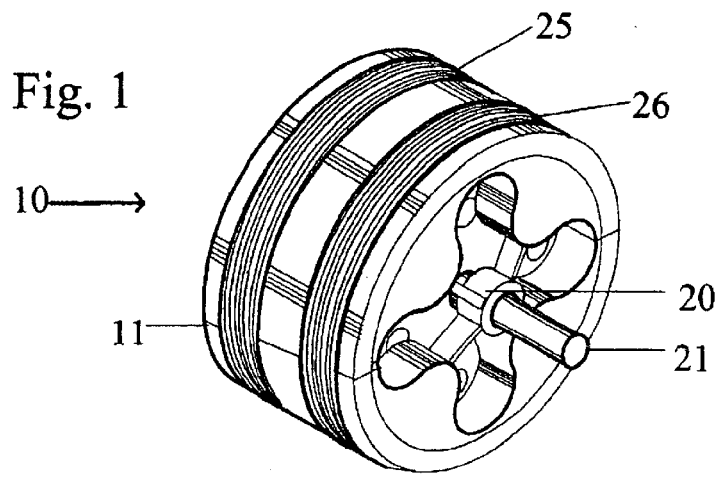
FIG. 1 is a perspective view of the electric motor of the present invention.

Referring now to FIG. 1, a simplified perspective view of the major structural components of the improved electric motor 10 of the present invention is illustrated. In particular, motor 10 comprises stator core 11, bearing support 20, coil 25, coil 26 and shaft member 21.

Figure 2:
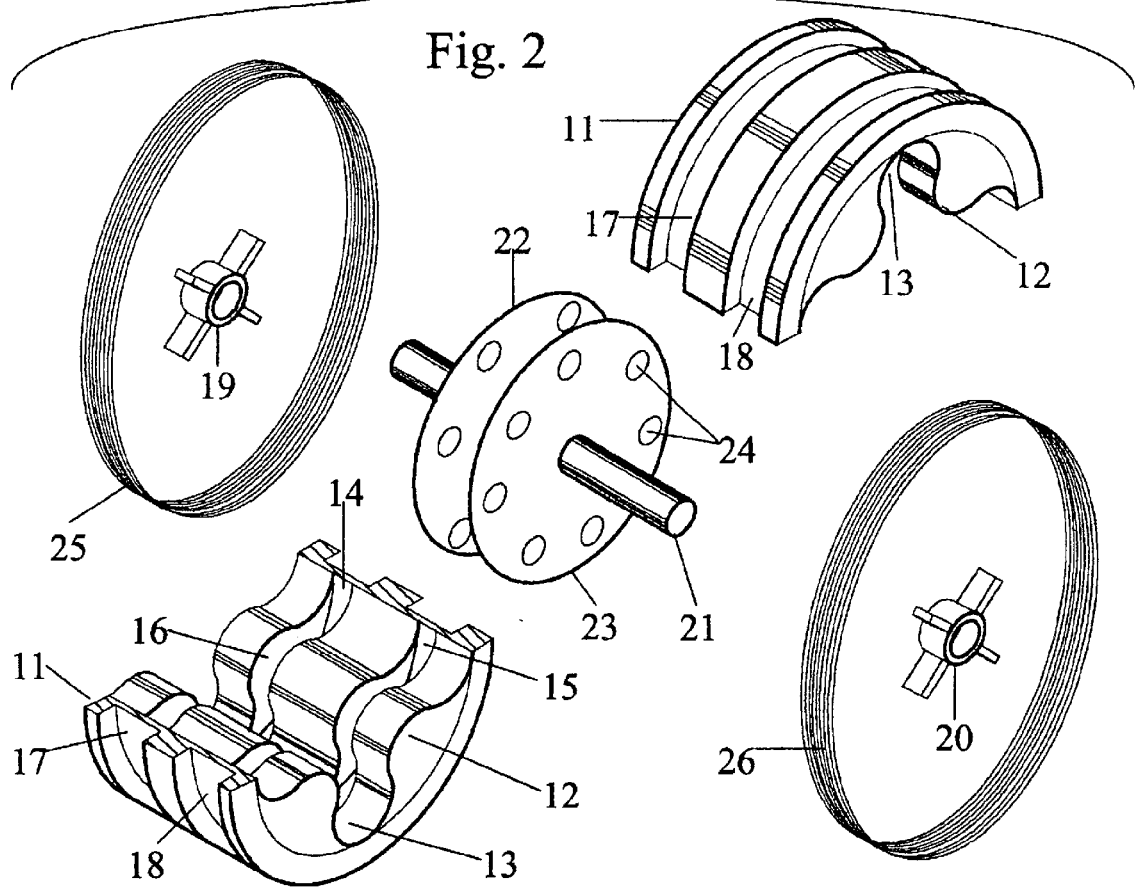
FIG. 2 is an exploded assembly view of the electric motor shown in FIG. 1.

FIG. 2 is an exploded view illustrating the components forming the electric motor 10 of the present invention. In particular, motor 10 comprises cylindrical stator core 11, made of ferromagnetic material, having a series of interior corrugations forming peaks 12 and valleys 13 intersected by interior annular grooves 14 and 15, the intersections of corrugation peaks 12 and annular grooves 14 and 15 forming pole faces 16. The exterior of core 11 has exterior annular notches, or depressions, 17 and 18 formed about the circumference of core 11, notches 17 and 18 adapted to receive coils 25 and 26, respectively. Bearing supports 19 and 20 and rotor disks 22 and 23 having a plurality of permanent magnets 24 embedded around the circumference of each rotor disk are mounted on shaft 21. The number of rotor disks utilized in motor 10 corresponds to the number of annular grooves 14 formed along the internal circumference of core 11. Although motor 10 illustrates two coils and two corresponding rotor disks, additional sets of coils and disks can be utilized in accordance with the torque and cost requirements of the user.

Figure 3A:
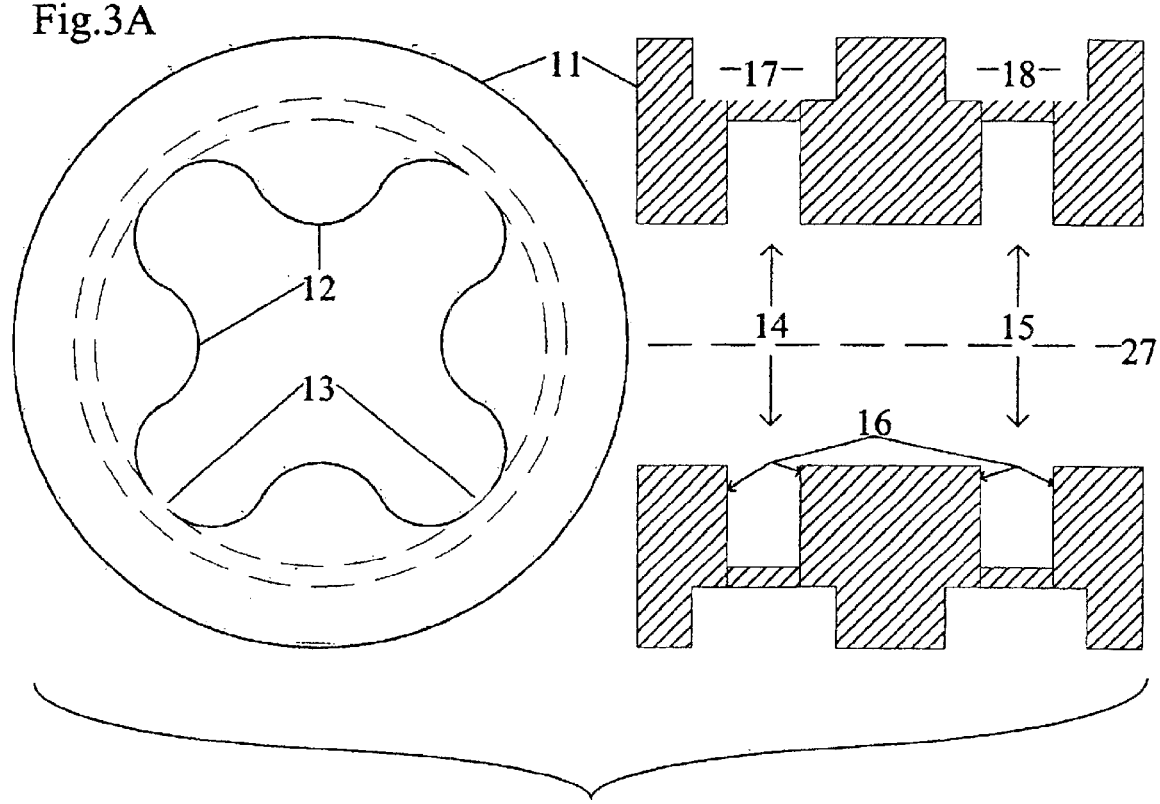
FIG. 3A illustrates side and front views of the stator component of the motor of the present invention.
Figure 3B:
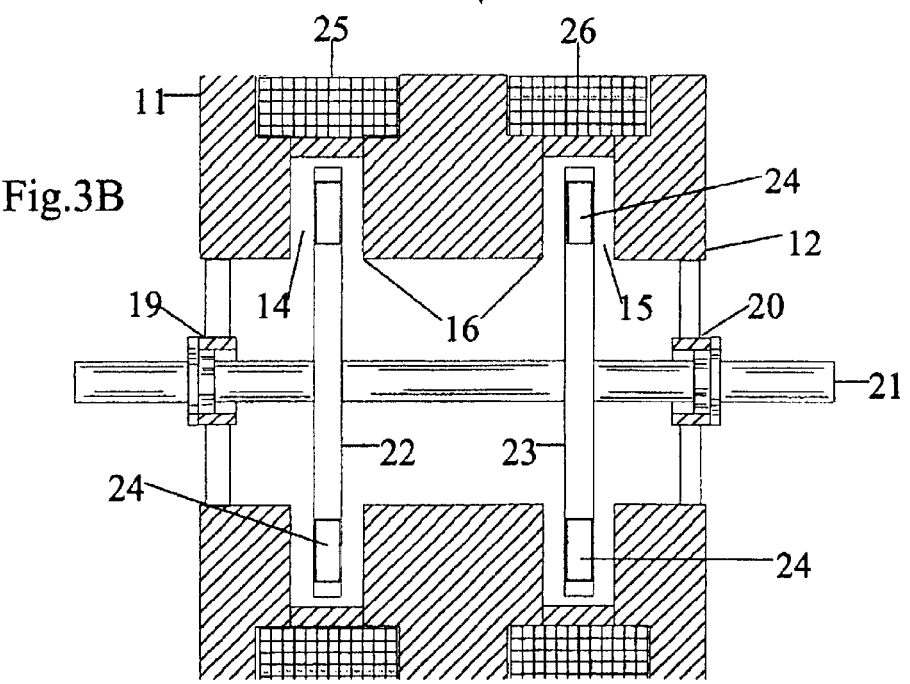
FIG. 3B is a side sectional view illustrating the motor core structure.

FIGS. 3A and 3B illustrate in detail the construction of cylindrically shaped core 11, core 11 being fabricated from ferromagnetic material and having exterior annular notches 17 and 18 formed therein. A plurality of corrugations is formed about a circumference and along the longitudinal axis 27 within the interior surface of core 11 forming peaks 12 and valleys 13. Annular grooves 14 and 15 extend about the interior surface of core 11, the intersection of grooves 14 and 15 and corrugation peaks 12 forming pole faces 16.

FIG. 3B is a sectional view illustrating the assembled motor 10. Rotor disks 22 and 23 are mounted to shaft 21 and supported by bearing supports 19 and 20, supports 19 and 20 being attached to the stator core 11 ends in a conventional manner. Disks 22 and 23 rotate within annular grooves 14 and 15, disk magnets 24 being positioned so as to alternately align with pole faces 16 formed at the intersection of annular grooves 14 and 15 and corrugation peaks 12. Coils 25 and 26 are wound within exterior annular notches 17 and 18 function as solenoids centered about interior grooves and disks.

Figure 4A:
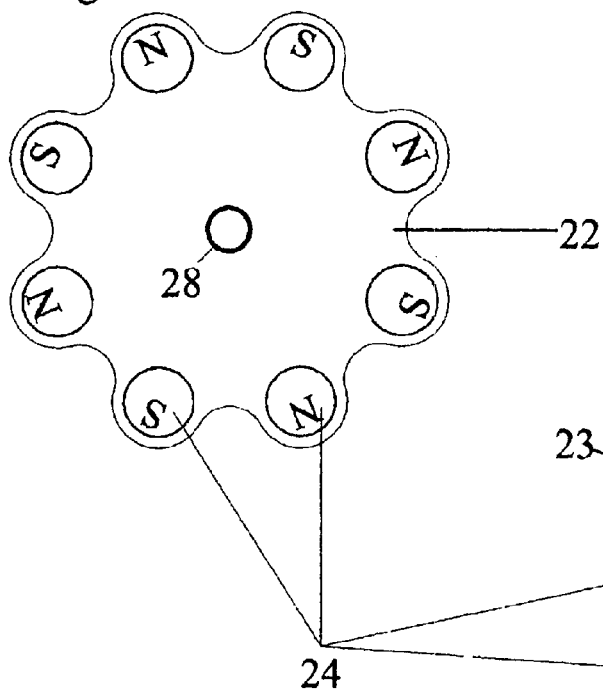
FIGS. 4A–4C are simplified views illustrating a rotor disk configuration and the alternating permanent magnet arrangements.
Figure 4B:
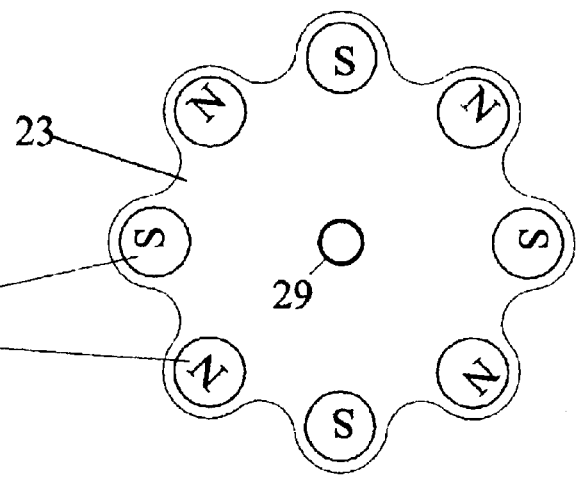
Figure 4C:
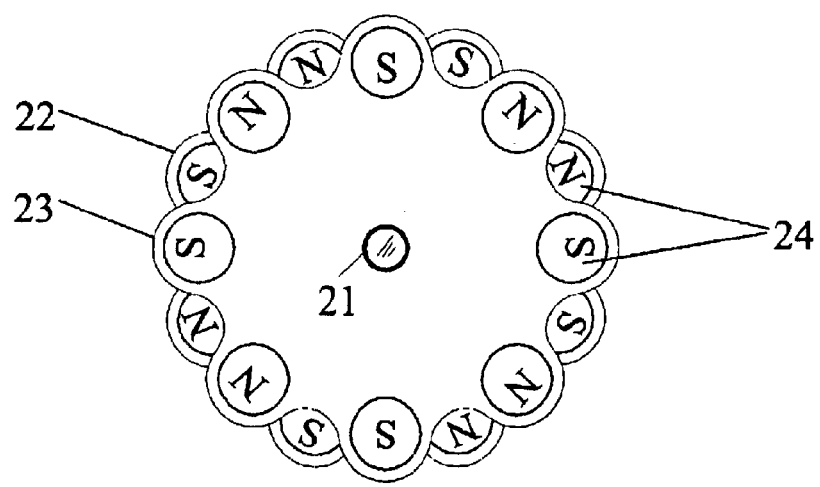

FIGS. 4A–4C show the construction of rotor disks 22 and 23 in more detail. Referring to FIG. 4A, rotor disk 22 comprises a plurality (eight in the embodiment illustrated) of permanent magnets 24 embedded about the disk circumference in a conventional manner with the polarities shown. An aperture 28 is formed in rotor disk 22, aperture 28 being sized to allow shaft 21 to extend there through. Rotor disk 23 is constructed in an identical manner and, as shown in FIG. 4B, comprises a plurality of permanent magnets 24 embedded about the disk circumference in a conventional manner with the polarities shown. An aperture 29 is formed in rotor disk 23, aperture 29 being sized to allow shaft 21 to extend there through.

FIG. 4C is a view illustrating rotor disks 22 and 23 mounted on shaft 21 such that disks and magnets are offset about their circumference by n degrees. The circumferential offset is dependent on the number of corrugation peaks 12 and valleys 13 within stator core 11 and the number of magnets 24 on each rotor disk. In essence, n is equal to 360 divided by the number of magnets; in this case, 360 divided by 16, n therefore being equal to 22.5 degrees in this instance. The circumferential offset is such that when disks 22 and 23 rotate within annular grooves 14 and 15 within stator core 11 magnets 24 from the first disk will align with pole faces 16 and valleys 13 while magnets 24 from the second disk set are offset from pole faces 16 and valleys 13 by n degrees.

To fully understand the above-described invention, the operation of the motor of the present invention is now described. Referring to FIG. 3A, the stator core 11 has (in the embodiment illustrated) four corrugation peaks 12 and four corrugation valleys 13. These corrugations create areas of higher (peaks 12) and lower (valleys 13) magnetic permeability within stator core 11. As illustrated in FIGS. 4A and 4B, rotor disks 22 and 23 have eight magnets 24 so arranged that magnet poles alternate in polarity about each disk. When rotor disks 22 and 23 are mounted on shaft 21 as shown in FIG. 4C and rotate in grooves 14 and 15 within stator core 11, four magnets 24 align with corrugation peaks 12 and pole faces 16; and four magnets 24 align with corrugation valleys 13. Thus, four magnets 24 align with areas of higher permeability (peaks 12) and four magnets 24 align with areas of lower permeability (valleys 13).

FIG. 4C illustrates that the circumferential offset between disks 22 and 23 when mounted on shaft 21 allow for first disk and magnet set to be in alignment with pole faces 16 and corrugation valleys 13; alternately the second disk and magnet set will be offset from the same pole faces 16 and corrugation valleys 13 by n degrees.

Returning to FIG. 3B, when rotor disks 22 and 23 are mounted on shaft 21 and rotate in annular grooves 14 and 15 within stator core 11 they are centered within exterior annular notches 17 and 18 having coils 25 and 26, respectively. Since the assembly of stator core 11 with coils 25 and 26 wound in notches 17 and 18 form two solenoids, disks 22 and 23 rotate within the center of a solenoid perpendicular to the magnetic axis of the solenoids.

Figure 5A:
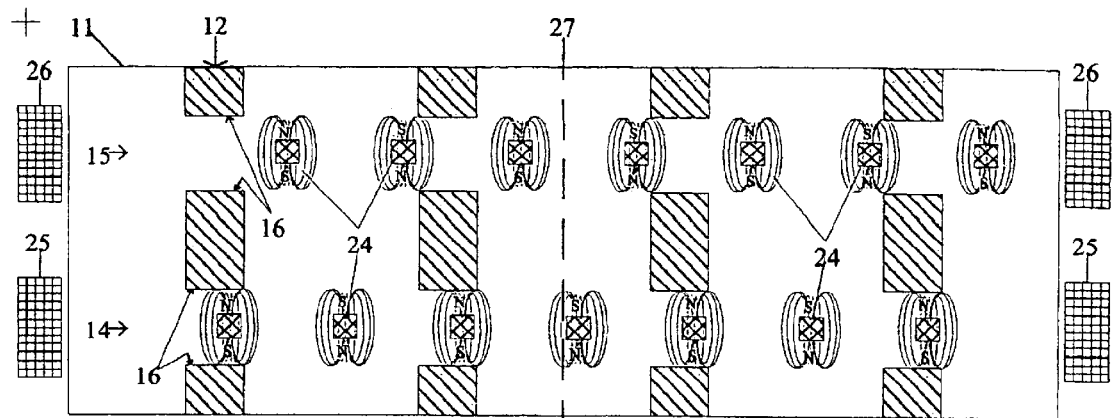
FIGS. 5A–5C illustrate the efficient shaping and utilization of the core flux.
Figure 5B:
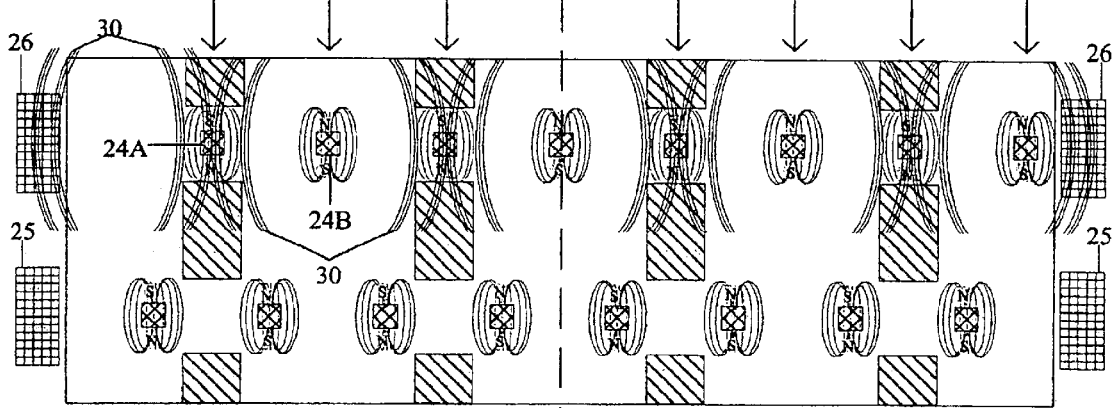
Figure 5C:
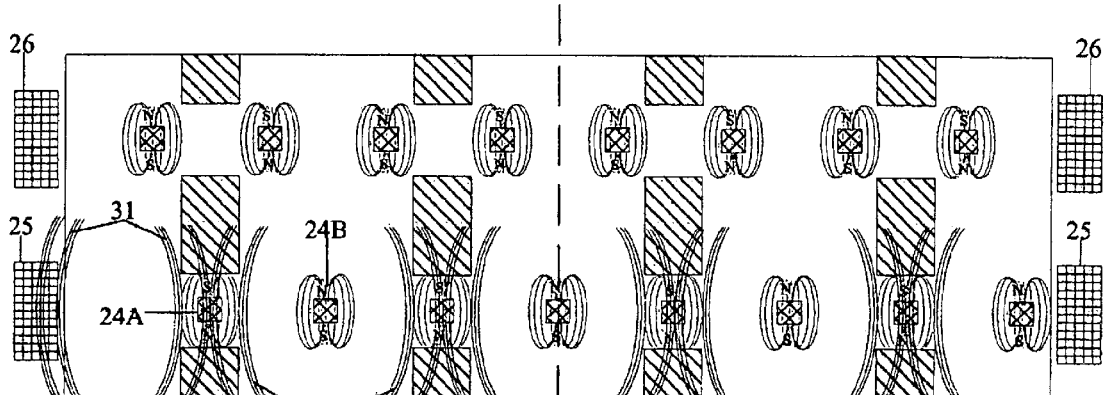

Referring now to FIGS. 5A–5C (the views are cutaways laid flat along an axis perpendicular to longitudinal axis 27), in FIG. 5A stator core 11 is shown split down along its longitudinal axis 27 and laid flat, corrugation peaks 12 and valleys 13 running parallel with axis 27, magnets 24 within annular groves 14 and 15 being perpendicular to the longitudinal axis 27 and centered within coils 25 and 26. In addition, pole faces 16 are created at the intersection of peaks 12 and grooves 14 and 15.

Referring to FIG. 5B, details of the operation of motor 10 are illustrated. In particular, as coil 26 is energized, magnetic field lines 30 are created within stator core 11. Since stator core 11 has areas of varying magnetic permeability (peaks 12 and valleys 13), field lines will congregate towards peaks 12 (areas of higher magnetic permeability). Conversely, valleys 13 (areas of lower magnetic permeability) will contain less field lines, the permeability variance creating a preferred stator coil flux "shape". Magnets 24A that are in polarity with the coil core field 30 will be attracted to the pole faces 16, magnets 24B in opposing polarity will be repelled away from the pole faces 16 to the formed areas of lower permeability (valleys 13), causing rotation of shaft 21.

As the magnets 24B being repelled move to an area of lower permeability (valleys 13), the coil core field 30 is forced out and away from themselves and into the area of higher permeability (peaks 12), increasing the number of flux lines available for an attractive force at the pole face 16. Conversely, magnets 24A being attracted to pole faces 16 will also draw field lines 30 into alignment with themselves and away from the repelled magnets 24B, thus shaping or reinforcing the coil flux shape.

FIG. 5B illustrates the effect of the disk offset shown in FIG. 4C. In particular, when the magnets 24 within coil 26 align with pole faces 16 and corrugation valleys 13, the magnets 24 centered within coil 25 are positioned for the energizing of coil 25 and are offset from corrugation peaks 12 and thereby pole faces 16.

FIG. 5C now shows coil 25 being energized; coil field lines 31 congregating towards corrugation peaks 12 and thus the pole faces 16 within stator core 11. Magnets 24A with like polarity to coil field 31 are attracted to the pole faces 16, magnets 24B with magnetic field in opposition to coil field lines 31 move to corrugation valleys 13 (areas of lower magnetic permeability), causing further rotation of shaft 21.

FIG. 5C also illustrates the effect of active flux shaping or "reinforcing", as magnets 24A pull coil field lines 31 into themselves as they rotate to pole faces 16 (and thus to corrugation peaks 12, areas of higher magnetic permeability), this action "reinforcing" the field shape created by stator core 11. Conversely magnets 24B, being in opposition to coil field 31, rotate to corrugation valleys 13 (areas of lower magnetic permeability) again "reinforcing" the preferred shape of coil flux created by stator core 11. The effect of disk and magnet offset as described with reference to FIG. 4C occurs again as now the magnets 24 centered within coil 26 are positioned for coil 26 to be energized. This process is repeated as each coil is energized sequentially and with alternating current flow thereby causing rotation of shaft 21.

The present invention thus provides an improved motor construction wherein the stator is designed such that the repositioning of the rotor disks and magnets, in addition to causing the motor shaft to rotate, also shapes or reinforces the core flux field, thus increasing motor efficiency and torque output.

Figure 6A:
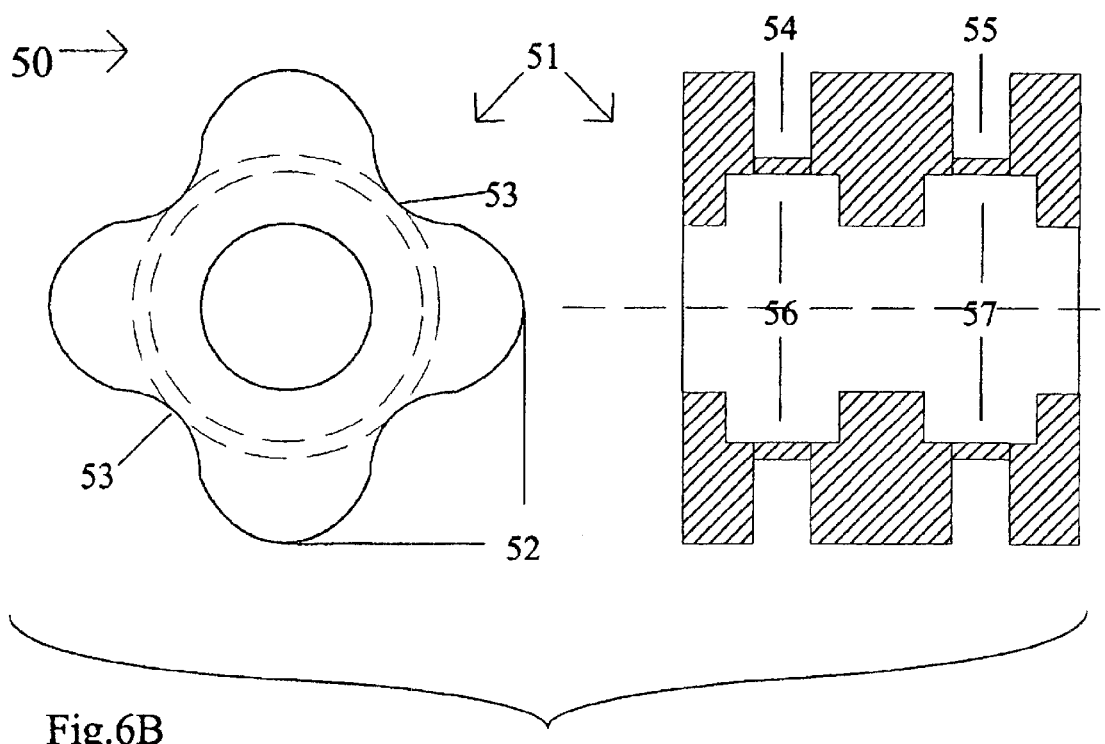
FIGS. 6A and 6B illustrate a second embodiment of the present invention.
Figure 6B:
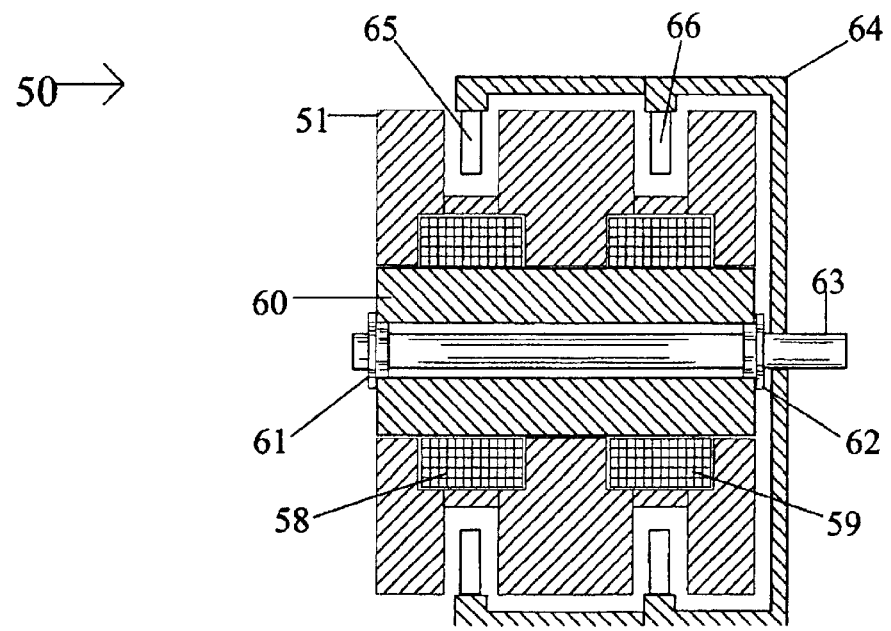

FIGS. 6A and 6B illustrate an alternate embodiment of the present invention. In essence, the components and operation of this embodiment is identical to that shown in the embodiment shown in FIGS. 1–5 but the position of the annular core grooves and stator coils are arranged "inside-out". This configuration provides a smaller sized motor 50 required in specific applications.

FIG. 6A illustrates motor 50 side sectional and front views comprising stator core 51 showing corrugation peaks 52 and valleys 53, exterior annular grooves 54 and 55 and interior annular grooves 56 and 57.

FIG. 6B illustrates the "inside-out" assemblage of motor 50, coils 58 and 59 being wound in interior grooves 56 and 57, bearing support 60 centered within core 51 and coils 58 and 59, bearings 61 and 62 mounted in the ends of said bearing support 60 with shaft 63 extending there-through, shaft 63 attached to rotor cup 64, permanent magnet disks 65 and 66 formed within rotor cup 64 and centered within exterior grooves 54 and 55 (two rotor disks are utilized in the embodiment illustrated).

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. An axial flux motor having a longitudinal axis and comprising a cylindrically shaped stator member having external and internal surfaces, said external surface having first and second spaced notch portions for receiving first and second coils, respectively, positioned therein, said internal surface having first and second corrugations formed along said longitudinal axis and a first annular groove positioned between said first and second corrugations; and a first rotor disk having a circumferential edge portion and positioned within said cylindrically shaped stator member, said first rotor disk being aligned with said first coil, said first rotor disk having a first set of a plurality of magnets formed adjacent said edge portion and around the circumference thereof, said magnets passing within said first annular groove when said rotor is rotated with respect to said stator.

2. The axial flux motor of claim 1 further including a second rotor disk positioned within said cylindrically shaped stator member, said second rotor disk having a circumferential edge portion and being aligned with said second coil, said second rotor disk having a second set of a plurality of magnets formed adjacent said edge portion and around the circumference thereof, said internal surface of said stator member having a second annular groove, said second set of magnets passing within said second annular groove when said second rotor is rotated with respect to said stator.

3. The axial motor of claim 2 wherein said first and second disk rotors are adjacent to each other, said first set of plurality of magnets being arranged such that said first set of magnets are opposed in polarity about the circumference of said first rotor disk and said second set of plurality of magnets being arranged such that said second set of magnets are opposed in polarity about the circumference of said second rotor disk.

4. The axial motor of claim 3 wherein a magnet on the circumference of said first rotor disk has a first polarity and is positioned adjacent a magnet on the circumference of said second rotor disk having said first polarity.

5. The axial motor of claim 4 wherein the intersection of said first corrugation and said first annular groove forms a pole face.

6. The axial motor of claim 5 wherein selected magnets on said first and second rotor disks align with said pole face and selected magnets on said first and second rotor disks are offset from said first corrugation and said pole face.

7. An axial flux motor having a longitudinal axis and comprising a cylindrically shaped stator member having external and internal surfaces, said internal surface having first and second spaced notch portions for receiving first and second coils, respectively, positioned therein, said external surface having first and second corrugations formed along said longitudinal axis and a first annular groove positioned between said first and second corrugations; and a first rotor disk having a circumferential edge portion and positioned within said cylindrically shaped stator member, said first rotor disk being aligned with said first coil, said first rotor disk having a first set of a plurality of magnets formed adjacent said edge portion and around the circumference thereof, said magnets passing within said first annular groove when said rotor is rotated with respect to said stator.

8. The axial flux motor of claim 7 further including a second rotor disk positioned within said cylindrically shaped stator member, said second rotor disk having a circumferential edge portion and being aligned with said seconds coil, said second rotor disk having a second set of a plurality of magnets, said internal surface of said stator member having a second annular groove, said second set of magnets formed adjacent said edge portion and around the circumference thereof, passing within said second annular groove when said second rotor is rotated with respect to said stator.

9. The axial motor of claim 8 wherein said first and second disk rotors are adjacent to each other, said first set of plurality of magnets being arranged such that said first of magnets are opposed in polarity about the circumference of said first rotor disk and said second set of plurality of magnets being arranged such that said second set of magnets are opposed in polarity about the circumference of said second rotor disk.

10. The axial motor of claim 9 wherein a magnet on the circumference of said first rotor disk has a first polarity and is positioned adjacent a magnet on the circumference of said second rotor disk having said first polarity.

11. The axial motor of claim 10 wherein the intersection of said first corrugation and said first annular groove forms a pole face.

12. The axial motor of claim 11 wherein selected magnets on said first and second rotor disks align with said pole face and selected magnets on said first and second rotor disks are offset from said first corrugation and said pole face.

* * * * *